(12) United States Patent
Mlynar

(10) Patent No.: US 12,073,612 B2
(45) Date of Patent: Aug. 27, 2024

(54) APPARATUS AND METHOD FOR PROCESSING DETECTION BOXES

(71) Applicant: Imagination Technologies Limited, Kings Langley (GB)

(72) Inventor: Juraj Mlynar, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 650 days.

(21) Appl. No.: 17/207,277

(22) Filed: Mar. 19, 2021

(65) Prior Publication Data
US 2021/0350161 A1    Nov. 11, 2021

(30) Foreign Application Priority Data
Mar. 20, 2020    (GB) ..................................... 2004114

(51) Int. Cl.
| | | |
|---|---|---|
| *G06K 9/00* | (2022.01) | |
| *G06T 1/20* | (2006.01) | |
| *G06T 7/11* | (2017.01) | |
| *G06T 7/136* | (2017.01) | |
| *G06T 11/20* | (2006.01) | |
| *G06V 10/25* | (2022.01) | |
| *G06V 10/762* | (2022.01) | |
| *G06V 10/96* | (2022.01) | |

(52) U.S. Cl.
CPC ............... *G06V 10/96* (2022.01); *G06T 1/20* (2013.01); *G06T 7/11* (2017.01); *G06T 7/136* (2017.01); *G06T 11/20* (2013.01); *G06V 10/25* (2022.01); *G06V 10/762* (2022.01); *G06T 2207/20021* (2013.01); *G06T 2207/20084* (2013.01); *G06T 2210/12* (2013.01)

(58) Field of Classification Search
CPC ...... G06V 10/96; G06V 10/25; G06V 10/762; G06V 10/82; G06V 10/764; G06V 20/56; G06V 20/588; G06V 10/454; G06V 20/58; G06T 1/20; G06T 7/11; G06T 7/136; G06T 11/20; G06T 2207/20021; G06T 2207/20084; G06T 2210/12; G06T 7/0004; G06T 2207/30148; G06T 7/10; G06F 18/23; G06F 30/392; G06N 3/045; G06N 3/08; G06N 3/084; G06N 3/047; G06N 3/04; G06N 3/048; G06N 3/0464; G06N 3/063; G06N 3/10; G06N 3/02; G06N 3/044; G06N 3/0442; G06N 3/0455; G06N 3/0495; G06N 3/082; G06N 3/09; G06N 7/01
See application file for complete search history.

(56) References Cited

U.S. PATENT DOCUMENTS

| | | | |
|---|---|---|---|
| 9,301,395 B2 * | 3/2016 | Liang | ................. H01G 9/28 |
| 2019/0130580 A1 * | 5/2019 | Chen | ................. G06V 10/82 |
| 2019/0325263 A1 | 10/2019 | Kellerman | |

* cited by examiner

*Primary Examiner* — Alex Kok S Liew
(74) *Attorney, Agent, or Firm* — Potomac Law Group, PLLC; Vincent M DeLuca

(57) ABSTRACT

A mechanism for performing non-maximum suppression (NMS) on a plurality of detection boxes identifying potential locations for one or more objects within an image. The mechanism uses a tiling system that divides the image into a plurality of tiles. A tile-by-tile suppression process is performed, in which at least some detection boxes that overlap a particular tile are processed to determine whether any detection boxes are to be discarded.

18 Claims, 7 Drawing Sheets

APPARATUS AND METHOD FOR PROCESSING DETECTION BOXES

BACKGROUND

An object detection process typically comprises processing an image, and generating detection boxes, occasionally labelled "bounding boxes", that outline a potential location of a target object (e.g. a person, face, tree etc.). Some object detection processes, such as single shot detection, can result in multiple detection boxes being generated for a single object.

There is therefore a need to perform a suppression process that aims to reduce the number of detection boxes that identify the same physical object. One widely used approach is non-maximum suppression (NMS).

NMS operates by processing each detection box using an IoU (intersection over union) process in turn. The IoU process comprises iteratively calculating an IoU value between the bounding box being processed and each other detection box sequentially. If the IoU value between two boxes exceeds a predetermined threshold, the detection box associated with the least confidence, that it identifies a target object, is discarded. Once a detection box is discarded, there is no need to continue/perform the IoU process for that detection box.

To address potentially ambiguous cases, e.g. where multiple detection boxes overlap one another, some NMS methods sort the detection boxes in order of confidence before performing the IoU process in the sorted order. Thus, the most confident detection box will be compared to all other boxes of a lower confidence, then the second most confident (assuming that is has not been discarded) will be compared to all other boxes of a lower confidence and so on.

There is an ongoing desire to reduce the complexity of suppression processes for reducing the number of detection boxes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure proposes a mechanism for performing non-maximum suppression, NMS, on a plurality of detection boxes identifying potential locations for one or more objects within an image. The mechanism proposes a tiling system that divides the image into a plurality of tiles. A tile-by-tile suppression process is performed, in which at least some detection boxes that overlap a particular tile are processed to determine whether any detection boxes are to be discarded.

According to an aspect, there is provided a computer-implemented method for performing non-maximum suppression, NMS, on a plurality of detection boxes identifying potential locations for one or more objects within an image.

The computer-implemented method comprises: dividing the image into a plurality of tiles; identifying, for each tile, which, if any, detection boxes overlap a portion of the tile; performing a tile-by-tile suppression process comprising, for each tile having detection boxes that overlap one another by more than a predetermined amount: comparing confidence values of detection boxes that overlap one another by more than a predetermined amount, a confidence value indicating the confidence that the detection box identifies an object, and for each comparison, marking the detection box associated with the lowest confidence value for discarding.

The tile-by-tile suppression process may comprise, for each tile, iteratively performing a thresholding process comprising selecting a first detection box overlapping a portion of the tile, wherein the first detection box has not been marked for discarding; selecting a second, different detection box overlapping a portion of the tile for comparing to the first detection box, wherein the second detection box has not been marked for discarding and wherein the first and second detection boxes have not previously been compared to one another during the thresholding process for the tile; determining a relative overlap between the selected first and second detection boxes; and in response to the determined relative overlap exceeding a predetermined threshold: marking the first detection box for discarding if the confidence value for the first detection box is less than the confidence value for the second detection box; and/or marking the second detection box for discarding if the confidence value for the second detection box is less than the confidence value for the first detection box, wherein the thresholding process for a tile is repeated until all detection boxes of that tile have either been compared to each other detection box of that tile or been marked for discarding.

The step of determining the relative overlap between the selected first and second detection boxes may comprise: determining a total area of the image occupied by the union of the first and second detection boxes; determining a total area of the image occupied by the intersection of the first and second detection boxes; and calculating the relative overlap by dividing the total area of the image occupied by the intersection of the first and second detection boxes by the total area of the image occupied by the union of the first and second detection boxes.

In some embodiments, the method further comprises a step of sorting the detection boxes by order of confidence, wherein: the step of selecting a first detection box comprises selecting the most confident detection box that has not been marked for discarding and has not previously been compared to all other detection boxes that have not been marked for discarding during the thresholding process for the tile; and the step of selecting a second detection box comprises selecting a detection box that has not been marked for discarding and has not previously been compared to the first detection box (during the thresholding process for that tile). The selected second detection box may, for example, be an arbitrary selection of a detection box meeting this criteria, or the (next) most confident detection box, i.e. the most confident detection box other than the already selected first detection box, that meets this criteria.

In some embodiments, the method comprises sorting the detection boxes by order of confidence, the sorting taking place before the tile-by-tile suppression process.

The tile-by-tile suppression process may comprise, for each tile, sorting the detection boxes overlapping a portion of the tile by order of confidence.

The size of each tile is preferably dependent upon an estimated ratio between size of the detection box and a resolution of the image. This may be calculated, for example, from historic and/or example images and corresponding detection boxes. In other embodiments, this ratio is provided by a user input or database/dataset.

The size of each tile may be dependent upon an estimated number of objects in the image. The size of each tile may also or otherwise be dependent upon an estimated size of a detection box and a resolution of the image.

The method may comprise: identifying detection boxes associated with a confidence value below a predetermined confidence value threshold; and marking detection boxes associated with a confidence value below the predetermined confidence value threshold for discarding.

In some embodiments, the step of identifying, for each tile, which, if any, detection boxes overlap a portion of the tile does not identify detection boxes that have already been marked for discarding. In other words, detection boxes that have already been marked for discarding are preferably not considered when determining which detection boxes overlap a tile.

The step of performing a tile-by-tile suppression process may be performed using a parallel processing technique.

The step of using the detection box data to identify, for each tile, which, if any, detection boxes overlap a portion of the tile may comprise generating, for each tile, a tile list identifying which, if any, detection boxes overlap a portion of the tile.

In some embodiments, the method may comprise building an output list of detection boxes, the output list identifying detection boxes that have never been marked for discarding during the tile-by-tile suppression process.

The method may be adapted so that the step of marking the detection box associated with the lowest confidence value for discarding comprises modifying a flag associated with the detection box; and the step of building an output list of detection boxes comprises processing the flags to identify detection boxes that have never been marked for discarding during the non-maximum suppression method.

The method may be adapted so that the step of building an output list comprises initializing a global list identifying all detection boxes, before performing the tile-by-tile suppression process, and the step of marking the detection box associated with the lowest confidence value for discarding comprises modifying a flag in the global list associated with the detection box for marking, so that when the tile-by-tile suppression process is complete, the global list facilitates provision of the output list identifying detection boxes that have never been marked for discarding.

The method may comprise a step of obtaining detection box data identifying, for each of the plurality of detection boxes, a location of the detection box within the image and a confidence value indicating the confidence that the detection box identifies an object, wherein the step of identifying, for each tile, which, if any, detection boxes overlap a portion of the tile comprises processing the detection box data to identify, for each tile, which, if any, detection boxes overlap a portion of the tile.

Some embodiments provide a computer-implemented method for performing non-maximum suppression, NMS, on a plurality of detection boxes identifying potential locations for one or more objects of different classes within an image, the computer-implemented method comprising; dividing the plurality of detection boxes into different classes, each class of detection box being associated with a different class of object; and performing any herein described NMS method on each class of detection box.

In some examples, the step of dividing the plurality of boxes into different classes is performed by obtaining classification data identifying, for each of the plurality of detection boxes, a class of the object for which the detection box identifies a possible location, and processing the classification data to divide the plurality of detection boxes into different classes.

According to another aspect, there is provided a graphics processing system configured to perform any herein described method.

The graphics processing system may comprise: a neural network accelerator configured to process an image to generate a plurality of detection boxes identifying potential locations for one or more objects within an image; and a processing module configured to obtain the plurality of detection boxes from the neural network accelerator and perform any herein described method.

Any described graphics processing system may be embodied in hardware on an integrated circuit.

There may be provided a method of manufacturing, at or using an integrated circuit manufacturing system, a graphics processing system as herein described. One method of manufacturing may comprise processing, using a layout processing system, a computer readable description of the graphics processing system so as to generate a circuit layout description of an integrated circuit embodying the graphics processing system; and manufacturing, using an integrated circuit generation system, the graphics processing system according to the circuit layout description.

There may be provided an integrated circuit definition dataset that, when processed in an integrated circuit manufacturing system, configures the system to manufacture a graphics processing system as herein described. There may be provided a non-transitory computer readable storage medium having stored thereon a computer readable description of a graphics processing system that, when processed in an integrated circuit manufacturing system, causes the integrated circuit manufacturing system to manufacture an integrated circuit embodying a graphics processing system.

There may be provided an integrated circuit manufacturing system comprising: a non-transitory computer readable storage medium having stored thereon a computer readable description of the graphics processing system; a layout processing system configured to process the computer readable description so as to generate a circuit layout description of an integrated circuit embodying the graphics processing system; and an integrated circuit generation system configured to manufacture the graphics processing system according to the circuit layout description.

There may be provided computer program code or computer readable code for performing any of the methods described herein. There may be provided a computer readable storage medium having encoded thereon the computer program/readable code.

There may be provided a (non-transitory) computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
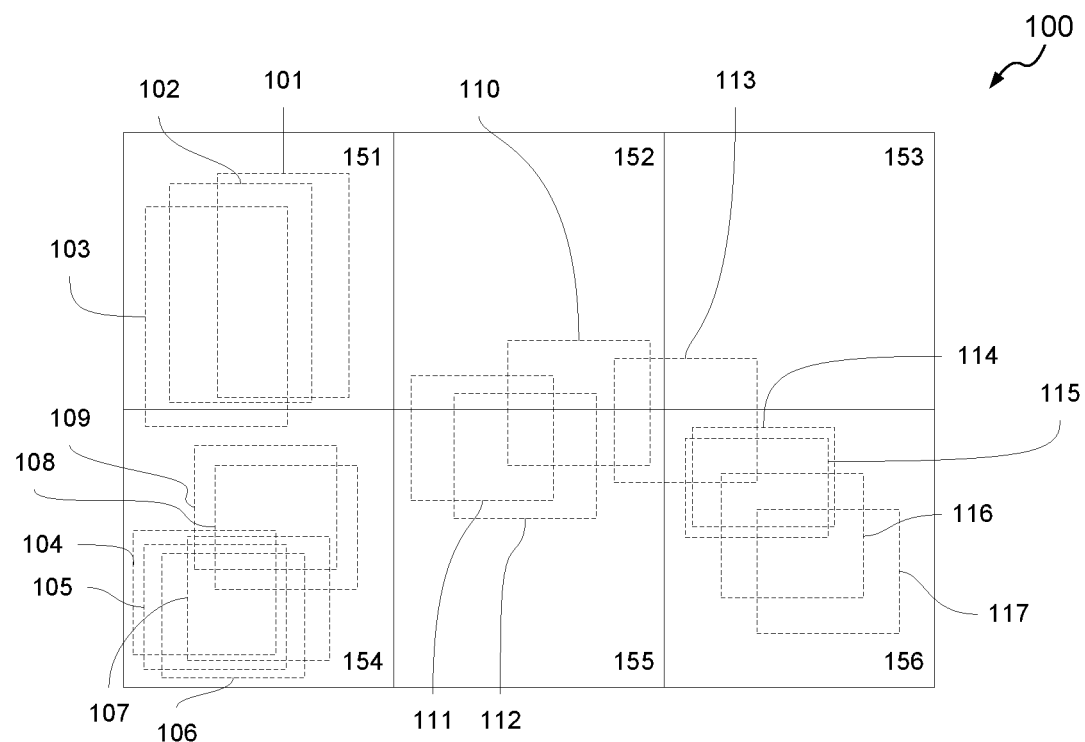
FIGS. 1 and 2 conceptually illustrate an exemplary image undergoing a method according to an embodiment.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

Figure 2:
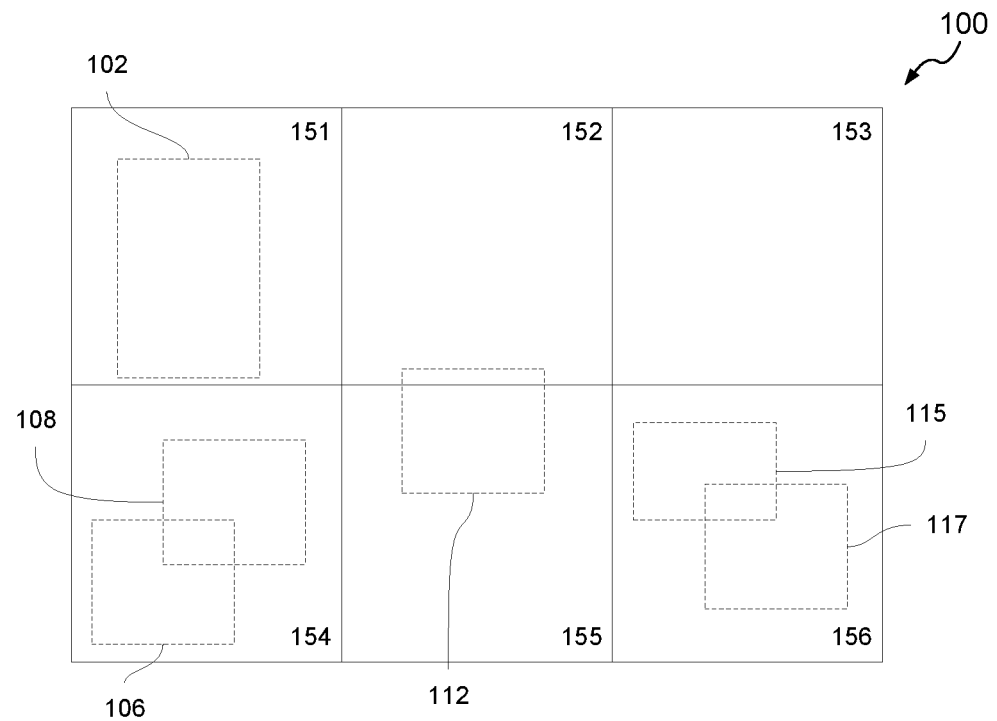

FIGS. 1 and 2 are used to conceptually understand a non-maximum suppression process according to an embodiment.

FIG. 1 is a simplified illustration of an image 100 that has undergone an object detection process to identify a plurality of detection boxes 101-117, but before a non-maximum suppression process has been performed on the detection boxes.

Each detection box 101-117 identifies a potential location for one or more (target) objects (not shown) within the image 100. For the illustrated embodiment, each detection box identifies a potential location for a same class of (target) object (e.g. face, person, tree and so on).

Each detection box is associated with a confidence value, which indicates a confidence that the detection box has accurately detected the location of an image. This information is a standard output of an object detection process. A confidence value typically ranges from 0 (least confident) to 1 (most confident), but other ranges are possible, e.g. 0 to 100.

Information on detection boxes may be contained in detection box data. Detection box data may indicate a relative location of the detection box within the image and a confidence value indicating the confidence that the detection box identifies an object. The skilled person would appreciate that detection box data is a standard output of an object detection process, and does not need to be described in detail.

A relative location or position of the detection box within the image may be provided using co-ordinates (e.g. indicating the location of vertices of the detection box) or using a combination of co-ordinates and dimension information (e.g. co-ordinates indicating the relative location of an upper left vertex of the detection box in the image and dimension information indicating the height and width of the detection box). Other methods or representing the relative location or position of a detection box within an image will be apparent to the skilled person.

FIG. 2 is a simplified illustration of the image 100 after a non-maximum suppression process has been performed on the detection boxes. The non-maximum suppression process is intended to remove or discard a number of the detection boxes, with the intended purpose of de-duplicating detection boxes that identify a potential location of a same instance of an object.

Typical non-maximum suppression processes comprise comparing an overlap between different detection boxes, and, when detection boxes overlap by more than a predetermined amount, deleting the detection box for which it is less confident that the detection box identifies the location of an object. Typically, this process is iteratively performed, preferably starting with the most confident detection boxes and moving to the least confident detection boxes, until all detection boxes have either been compared to each other detection box, or have been discarded.

The present disclosure relates to an alternative method of performing non-maximum suppression. In particular, the method of performing non-maximum suppression uses a tile-by-tile suppression mechanism.

FIG. 1 and FIG. 2 both conceptually illustrate a concept of dividing the image into a plurality of tiles 151-156. Each detection box 101-117 overlaps at least one of these tiles.

For each tile, the detection boxes that overlap at least a portion of that tile are identified. It will be apparent that a detection box may be identified for multiple different tiles.

A tile-by-tile suppression process is then performed. The tile-by-tile process comprises processing each tile in turn: to compare an overlap between different detection boxes (in that tile), and marking for discarding/deletion, detection boxes that overlap another detection box by more than a predetermined amount and are less confident (in identifying a target object) than the overlapping detection box.

As a consequence of the tile-by-tile suppression process, each tile may be processed only once. In this way, a non-maximum suppression process is performed between a plurality of different detection boxes whilst processing each tile only once. One advantage of a tile-by-tile suppression process (such as the one herein described) is that two forms of parallelisation of the overall NMS is enabled. Each tile can be processed in parallel, to provide one form of parallelisation. Moreover, when processing any given tile, comparisons between detection boxes within that tile can be performed in parallel, to provide a second form of parallelisation.

Put another way, parallelization can be achieved by performing comparisons across multiple tiles at once and/or performing multiple comparisons within each tile.

In some preferred examples, during processing for a particular tile, all detection boxes that overlap at least a portion of that tile are compared to one another (i.e. to compare an overlap between different pairs of detection boxes), unless that detection box has previously been marked for discarding during (earlier) processing for that particular tile.

The comparison between detection boxes within a tile is preferably performed in order of confidence. Thus, the most confident detection box may be compared to all other detection boxes of lower confidence in that tile, then the next most confident is compared to all other detection boxes of a lower confidence and so on. If a detection box is marked for discarding, then the comparison process does not need to be performed (or continued) for the detection box marked for deletion.

Consider tile 151 as an example. Three detection boxes 101-103 overlap at least a portion of this tile. In the illustrated scenario, the detection boxes are in the following order of confidence: 102; 101; 103. Starting with the most confident, detection box 102 is compared to detection box 101. The overlap between detection boxes 102 and 101 exceeds a predetermined threshold, so the less confident detection box 101 is marked for deletion. Detection box 102 is then compared to detection box 103. The overlap between detection boxes 102 and 103 also exceeds a predetermined threshold, so the less confident detection box 103 is marked for deletion.

Thus, in the example described for tile 151, only a single detection box is left unmarked for deletion.

After the tile-by-tile suppression process has been performed, detection boxes 102, 106, 108, 112, 115, 117 that have never been marked for deletion/discarding (during the tile-by-tile suppression process) can be identified. An output list of these detection boxes can then be generated. The detection boxes in the output list are illustrated in FIG. 2.

By only identifying those that were never marked for deletion, this avoids detection boxes that would have otherwise been discarded in the conventional NMS approach from being retained in the herein proposed NMS mechanism.

Turning back to the example tile 151, it can be seen that the only remaining detection box (previously overlapping the tile 151) is detection box 102. This is because detection boxes 101 and 103 were marked for discarding/deletion during the tile-by-tile suppression process.

In another example tile 153, no detection boxes are retained. This is because the only detection box 113 overlapping the tile 153 has been deleted due to overlapping another, more confident detection box (e.g. detection box 115) by more than a predetermined amount. Thus, detection box 113 was been marked for deletion during the processing of tile 156.

Thus, detection boxes that overlap more than one tile can be marked for deletion during any tile-specific process. By way of example, detection box 113 may not have been marked for deletion when processing tile 153, but may have been marked for deletion when processing tile 156.

In other tiles, more than one detection box is retained, e.g. detection boxes 115 and 117 in tile 156. This is because the detection boxes do not overlap one another by more than a predetermined amount (meaning that neither is marked for deletion when the detection boxes are compared).

The overlap between two detection boxes is preferably calculated using an Intersection over Union approach. This comprises calculating the size of the area occupied by the intersection of two detection boxes, and dividing this by the size of the area occupied by the union of the two detection boxes. This enables a relative overlap between the two detection boxes to be calculated easily, and effectively normalizes a relative overlap between two detection boxes.

The present disclosure recognises that the number of comparisons that are made between different detection boxes (e.g. to identify overlap between bounding boxes) can be reduced by restricting comparisons to detection boxes that are local to one another. The present disclosure proposes to use a tiling approach to effectively identify which detection boxes are proximate to one another, i.e. to group the detection boxes.

In this way, the complexity of the proposed NMS process is different to the complexity of existing NMS processes. In a number of circumstances and/or use case scenarios, this can enable significant reductions in the number of processing steps that are performed to execute an NMS process.

Processing in the tile-by-tile process described also enables parallelization of the suppression process to take place. This facilitates further increases to the speed of performing the NMS process. As previously mentioned, the use of the tile-by-tile suppression process facilitates two forms of parallelization to take place.

The step of using the detection box data to identify which, if any, detection boxes overlap a portion of the tile may be performed before the tile-by-tile suppression process takes place.

In other examples, this step is integrated into the tile-by-tile suppression process. The tile-by-tile suppression process may therefore comprise, for each tile, identifying any detection boxes that overlap a portion of the tile, comparing detection boxes that overlap one another by more than a predetermined amount and for compared detection boxes, marking the detection box associated with the lowest confidence value for discarding.

Now that a basic understanding of the underlying mechanism has been described, a more complete understanding of the process executed to perform non-maximum suppression can be understood by referring to FIGS. 3 to 7, which provide flowcharts and graphs illustrating various methods (and parts of methods) according to embodiments.

Figure 3:
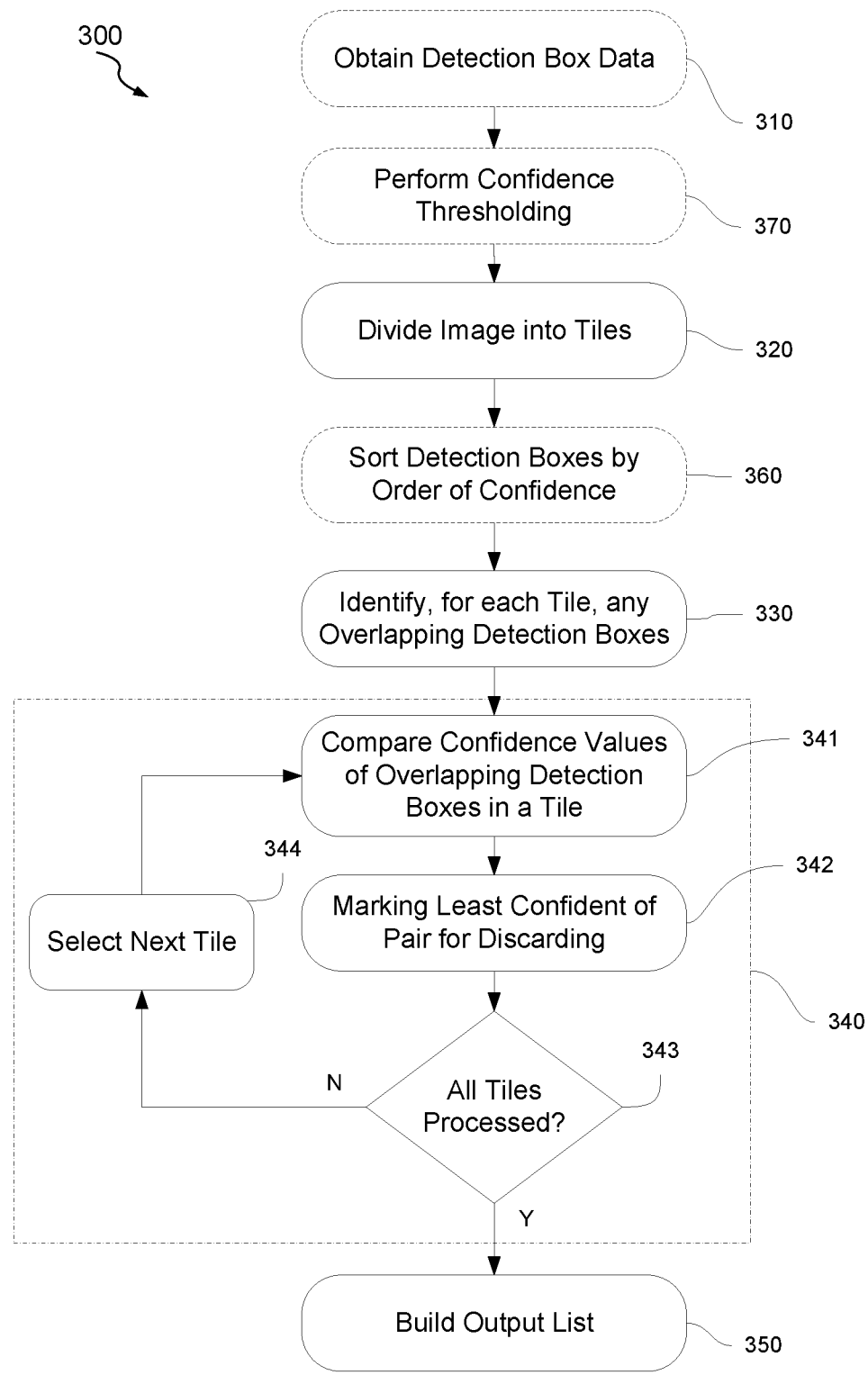
FIG. 3 is a flowchart illustrating a method according to an embodiment.

FIG. 3 is a flowchart illustrating a computer-implemented method 300 according to an embodiment. The method 300 is designed for performing non-maximum suppression, NMS, on a plurality of detection boxes identifying potential locations for one or more objects within an image.

The method 300 may comprise a step 310 of obtaining detection box data. In other instances, the detection box data may have already been obtained before executing method 300. As previously described, the detection box data identifies, for each of the plurality of detection boxes, a relative location of the detection box within the image and a confidence value indicating the confidence that the detection box identifies an object. The confidence value may be on any scale, but is preferably in the scale of 0 to 1.

The method 300 then moves to a step 320 of dividing the image into a plurality of tiles. The skilled person would appreciate that a tile is a distinct region, chunk or portion of the image. A tile is preferably rectangular. Suitable methods for selecting or controlling the number and/or size of the tiles will be described later.

The method 300 then moves to a step 330 of identifying, for each tile, which detection boxes, if any, overlap a portion of the tile. In other words, step 330 comprises identifying, for each tile, any detection boxes that overlap a portion of the tile. This may be performed by processing the detection box data obtained in step 310. Thus, step 330 identifies, for each detection box, which tile(s) that detection box overlaps. Step 330 may comprise generating, for each tile, an array or list identifying which detection boxes overlap a part of that tile—a "tile list".

The method 300 subsequently performs a tile-by-tile suppression process 340.

The process 340 comprises a step 341 of, for a tile, comparing confidence values of detection boxes that overlap one another by more than a predetermined amount. This overlap is determined with respect to the overall image, i.e. rather than with respect to the tile alone.

Process 340 also comprises a step 342 of, for each comparison, marking the detection box associated with the lowest confidence value for discarding.

Steps 341 and 342 may make use of a tile list, e.g. generated in step 330, to enable identification of which detection boxes are contained within a tile.

To mark detection boxes for discarding, some embodiments of steps 341 and 342 may use a global list of flags—"global flag array" or "global list"—each entry in the global flag array or global list identifying a detection box of the overall image. This global flag array may be generated before the tile-by-tile suppression process 340 is performed (or initialised in a first iteration of the process). The global flag array may be appropriately modified if a detection box is to be marked for discarding (e.g. a value of 0 indicates a detection box is to be discarded, 1 indicates a detection box is not to be discarded or vice versa).

One benefit of using a global flag array is that, for subsequent processing of tiles, detection boxes already marked for deletion can be identified and skipped/bypassed. This can help improve an efficiency of the proposed mechanism.

In some embodiments, an array of flags may be generated for each tile, each element in the array of flags corresponding to a respective detection box in that tile—"tile flag array". The array of flags may be appropriately modified if a detection box is to be marked for discarding, analogously to the global flag array.

One benefit of using a tile flag array is the avoidance of race conditions when accessing the tile flag array, i.e. during processing of a particular tile. This can facilitate less complex parallelization of the tile-by-tile suppression process.

In some embodiments, the functions of the "tile list" and "tile flag array" may be combined into a single array or list. For example, each entry in a "tile list" may identify a different box contained within a tile. When a detection box is marked for discarding, the value for the entry in the tile list corresponding to that detection box may be replaced with an invalid pointer/value (or a known, "empty" pointer/value), so that the tile list no longer identifies that detection box as forming part of the tile.

Steps 341 and 342 may be repeated within a tile until all detection boxes have been compared to one another and/or marked for discarding.

Steps 341 and 342 are repeated for each tile, which is illustrated by decision step 343 and next tile selection step 344. More detailed embodiments for steps 341 and 342 (i.e. for the tile-by-tile suppression process) will be described later.

After the tile-by-tile suppression process is complete, i.e. all tiles have been processed, the method 300 can perform a step 350 of building an output list of detection boxes. The output list of detection boxes identifies detection boxes that have never been marked for discarding during the non-maximum suppression method.

The method 300 may thereby produce an output list of detection boxes, the output list indicating detection boxes that have passed through the NMS process, and are considered representative of actual positions of a target object(s) within the image.

Where there is a global flag array, building the output list may comprise processing the global flag array to identify detection boxes that have not been marked for discarding.

Where there are tile flag arrays (or any other array that performs the same function as the tile flag array), building the output list may comprise processing the tile flag arrays to identify which detection boxes have not been marked for discarding by any of the tile flag arrays.

By performing the tile-by-tile suppression process, the number of other detection boxes that a single detection box has to be compared to is reduced. This can, in a number of circumstances, substantially reduce the complexity of the NMS process.

The method 300 may be adapted to further comprise a step 360 of sorting the detection boxes by order of confidence. This may be useful for ease of identifying the order in which to process the detection boxes within a tile (for use during the tile-by-tile suppression process).

This step 360 may be performed before step 330 (as illustrated), but may otherwise be implemented into the tile-by-tile suppression process (e.g. be performed on a tile-by-tile process before step 341). The skilled person will appreciate that the step 360 could be performed before, after or at the same time as step 320.

Preferably, the step 360 comprises using a sort index to sort the detection boxes. This avoids the need to move and order data structures in memory (which is a resource costly process). A sort index may comprise, for example, an array or vector of entries, each of which corresponds with a particular confidence rank. Each entry in the sort index identifies a different detection box (e.g. using a value or pointer), with the order of entries in the sort index indicating the rank of the detection boxes (e.g., a first entry is the most confident; a last entry is the least confident).

The sort index may be a "global sort index", identifying a confidence rank of all detection boxes in the overall image.

In some embodiments, the global sort index and global flag array are combined.

Thus, the global list may comprise a sort index. The value of an entry corresponding to a detection box to be marked for discarding may be set at a predetermined value (e.g. −1) to indicate that the previously associated detection box has been marked for discarding.

In one embodiment, a value in the global sort index is modified in response to a step marking the corresponding detection box for discarding (e.g. replacing the value/pointer that identifies the detection box within the sort index with an invalid value/pointer such as −1). This avoids the need to shift elements in the detection box data and/or the sort index (during the discarding progress). In this way, a global sort index may effectively act as the output list.

Of course, after the tile-by-tile suppression process is complete, the global sort index may need to be further processed to build a clean output list, e.g. by copying the remaining valid values (i.e. values identifying boxes that have not been marked for discarding) of the global sort index into a new output array or by simply removing entries in the sort index that have been marked for discarding (e.g. entries holding invalid values).

In other embodiments, a plurality of sort indexes may be generated, one for each tile, i.e. a "tile sort index".

The "tile list" and "tile sort index" may be combined into a single array or list.

In particular, a tile sort index may also be used to keep lists of detection boxes in each tile. The tile sort index may be a conventional sort index, each entry in the tile sort index identifying a different detection box in the tile, the order of the entries identifying an order of confidence of the detection boxes. Thus, the tile sort index may rank each detection box contained within a tile by order of confidence.

In preferable examples, the step 360 of sorting of the detection boxes is performed at a same time as step 330. Thus, each detection box may be processed to identify which tile(s) it overlaps and its (confidence value) position/rank with respect to other detection boxes (e.g. within the tile). In other words, a tile sort index may be generated for each tile, the tile sort index both indicating the detection boxes within a tile (e.g. by only containing/referencing the relevant detection boxes) and the (confidence) order of detection boxes within the tile.

In other examples, the step 360 of sorting the detection boxes is performed after step 330 is performed, e.g. within the tile-by-tile suppression process. Thus, when processing a tile, a tile sort index may be generated.

Moreover, the tile sort index may be used to mark, for that tile, whether a detection box has been marked for discarding. In other words, the functions of the "tile sort index" and "tile flag array" may be performed by a single array or list. This may be performed by setting the value corresponding to the detection box in the tile sort index to be discarded as an invalid/negative number.

It will also be clear that a tile sort index could act as an array that identifies detection boxes within a tile and an array of flags, whilst also providing appropriate confidence rank information. In other words, a tile sort index can also perform the functions of both a tile list and a tile flag array.

Approaches that combine a "tile list", "tile sort index" and/or a "tile flag array" make more efficient use of memory. It is, however, possible that one or more of these lists/indexes/arrays is kept independent of the other lists/indexes/arrays, e.g. for increase ease of bug fixing or for distributed storage of information.

It will be apparent that, as previously described, a global sort index and/or global flag array could be used. A global sort index and a global flag array may be combined in a similar manner to the tile sort index and the tile flag array, e.g. by setting the value corresponding to a particular detection box (in the global sort index) to be discarded as a negative/invalid number/value. Combining in this manner provides a similar use of memory advantage.

To further improve the efficiency of the NMS method, at the cost of potential accuracy, the method 300 may further comprise a step (not shown) of marking for discarding a number of the least confident detection boxes. Thus, in embodiments, only the most confident (e.g. the 100 most confident or the 200 most confident) detection boxes are processed in step 330.

The boundary for deciding whether to process the detection boxes in step 330 may be determined based on a predetermined number of detection boxes (e.g. only the top, i.e. most confident, 200 detection boxes) or a predetermined percentage of detection boxes (e.g. only the top 40% or top 50%).

This process is particularly advantageous if a sorting step 360 is performed, as this enables easy identification of the most confident detection boxes. Preferably, this process is performed at a same time as performing a sort operation.

Step 341 may comprise comparing detection boxes in order of confidence. Put another way, step 341 may comprise starting with the most confident detection box in the tile, and identifying other detection boxes that overlap that detection box by more than a predetermined amount, before proceeding to the next most confident detection box and so on.

To further improve the efficiency of the method 300, an additional step 370 of confidence thresholding may be performed. Step 370 may be performed before or after step 320, but is preferably performed before step 360 (if present) for improved efficiency.

Step 370 comprises marking any detection boxes associated with a confidence value below a predetermined threshold, or "confidence value threshold", for discarding. Thus, low-confidence detection boxes can be marked for discarding, thereby reducing a number of detection boxes that need to be processed.

A suitable value for the predetermined threshold, for a confidence value ranging from 0 to 1, is in the region of 0.1 to 0.9, e.g. 0.7 or 0.9. A predetermined threshold in the region of 0.6 to 0.7 would be a suitable compromise. The herein provided example suitable values of the predetermined threshold may be changed based on the maximum possible range of the confidence value (e.g. a threshold value referred to as 0.1 for a range of 0-1, may instead be a threshold value of 10 for a range of 0-100).

The skilled person will appreciate that an appropriate confidence value can vary depending upon the use case and/or implementation details. For example, the confidence value can vary depending upon the quality of the image (e.g. resolution, focus, distortion, noise etc.) and/or the accuracy of the object detection process used to generate the detection boxes. A threshold value of between 0.6 and 0.8 corresponds to reasonably good input image quality & resolution (e.g. a typical mobile phone image in good focus, no motion blur, good lighting) combined with current state-of-the art object detection processes.

Furthermore, a suitable threshold value may depend upon whether it is desirable to avoid false positives (e.g. for security analysis applications) and/or avoid false negatives (e.g. for automotive vehicle detection). False positives can be reduced by setting the threshold confidence value high (e.g. >0.7). False negatives can be reduced by setting the threshold confidence value low (e.g. <0.3, e.g. <0.15).

Extremely low thresholds (e.g. 0.1) could be used as well, to remove any unreliable detections (e.g. detections created by noise), which can result in a considerably shorter list of detections to process further.

To reduce the processing performed by the method, step 370 is preferably performed as early as possible, e.g. immediately after detection box data is obtained. This helps reduce processing time by discarding irrelevant detection boxes as early as possible.

The disclosed method 300 can be parallelized. In particular, process 340 can be parallelized (e.g. processing different tiles using different threads). This provides a specific and particular advantage of the proposed approach compared to conventional or typical non-maximum suppression approaches.

Parallelisation can introduce some complexity with collating results from all tiles, e.g. in step 350. A number of embodiments for performing step 350 could be envisaged.

In a first example, each thread produces a tile output list of detection boxes that have not been marked for deletion with respect to a particular, single tile. The tile output list may be generated from (or be equivalent to) a tile flag array. These results can be combined into a single output list identifying detection boxes that have never been marked (e.g. by combining all tile output lists and deleting repeated entries).

A second example recognises that detection boxes only need to be removed (never added), so that a global flag array is used. Flags could be cleared/modified by threads writing to it as they mark detection boxes for removal. If multiple threads attempt to change the same flag (i.e. remove the same detection) at the same time, they will write the same flag value to the same memory location, so there is a lower probability that there will be any race conditions (at least at the algorithmic level).

In some embodiments, there may be more than one class of object identified by a detection box. That is, different sets of detection boxes may identify a potential location for a different class of target object (e.g. one set may identify people's faces, whereas a different set identifies cats within an image).

In such embodiments, the method 300 may be separately performed for each class of target object. In other words, the method 300 may be performed on first detection box data (associated with a single class of a target object) and/or second detection box data (associated with a different class of target object).

In particular, embodiments may comprise obtaining classification data identifying, for each of the plurality of detection boxes, a class of the object for which the detection box identifies a possible location; dividing the plurality of detection boxes into different classes by processing the classification data, each class of detection box being associated with a different class of object; and performing the method 300 on each class of detection box.

Thus, the detection box data may effectively be divided into a plurality of classes, and the method 300 may be applied on each class.

When the method 300 is performed for different classes, multiple instances of method 300 (one for each of a plurality of classes) may be performed in parallel, e.g. using different threads of a processing system. This further improves the efficiency of the overall NMS process.

When the method 300 is performed for different classes, the method may comprise a step of bucketing or binning detection boxes into different groups/sets of class, i.e. performing a "class separation" step.

When such a bucketing/binning step is performed, a sorting and/or confidence thresholding step may be performed at the same time. This further improves the efficiency of the method, which is a simple two-level comparison function. Performing a class separation step and a sorting (by confidence) step simultaneously is functionally equivalent to performing a sorting step in which a first priority is class ID and second priority is confidence.

Figure 4:
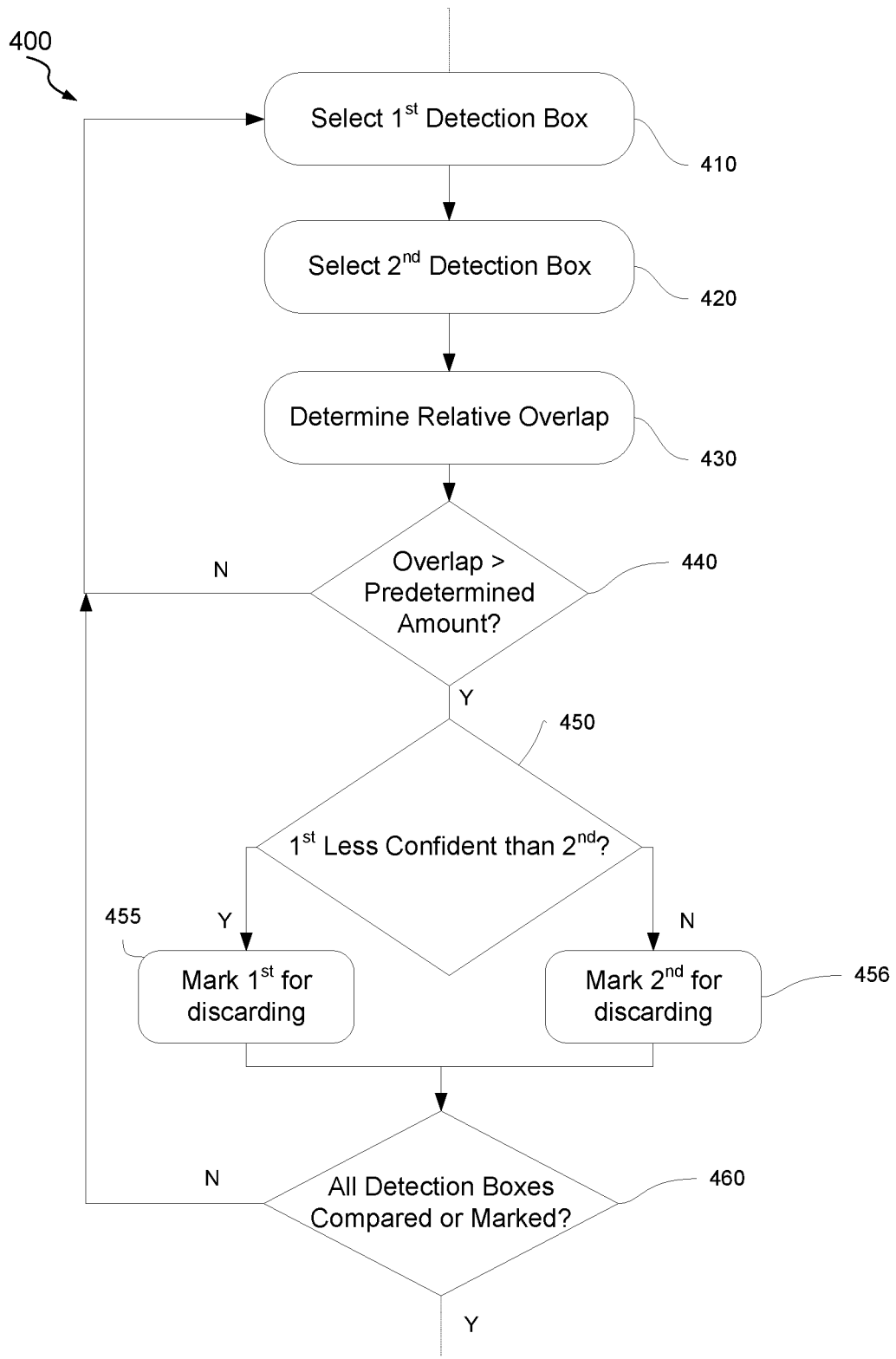
FIG. 4 is a flowchart illustrating an aspect of a method.

FIG. 4 illustrates an aspect 400 of the tile-by-tile suppression process (process 340 in FIG. 3) according to an embodiment. In particular, FIG. 4 illustrates an embodiment of steps 341 and 342 (the process performed for a single tile).

The skilled person would appreciate that process 400 is only one embodiment, and would be readily capable of adapting the process 400 for different version of the concept disclosed.

The process 400 comprises a step 410 of selecting a first detection box. The first detection box overlaps a portion of the tile, and has not been marked for discarding (within the process 400 for that tile). Moreover, it will be apparent that the selected first detection box will not be a detection box that has been compared to all other (unmarked for discarding) detection boxes.

The process 400 also comprises a step 420 of selecting a second (different) detection box for comparing to the first detection box. The second detection box also overlaps a portion of the tile and has not been marked for discarding (within the process 400 for that tile). Moreover, the second detection box will be a detection box that has not been previously compared to the first detection box (within the process 400 for that tile).

Steps 410 and 420 may be performed sequentially (as illustrated) or in parallel.

Preferably, the detection boxes have previously been sorted in order of confidence, e.g. based upon the associated confidence value for each detection box.

In such an example, the first detection box may be the detection box having the highest confidence value that also meets the aforementioned criteria for the first detection box (i.e. not marked for discarding, not been compared to all other (unmarked for discarding) detection boxes).

Similarly, the second detection box may be the detection box having the (next) highest confidence value that also meets the aforementioned criteria for the second detection box (i.e. not marked for discarding, not previously been compared to the first detection box). This aspect is not essential, e.g. a pseudorandom selection of a detection box may be made or the least confident detection box may be selected.

The method then moves to a step 430 of determining a relative overlap between the selected detection boxes. This may comprise determining a proportion of the detection boxes that overlap one another with respect to the total area of the image occupied by the detection boxes. A more complete example of step 430 will be provided later.

The method then determines in a step 440 whether the (relative) overlap is more than a predetermined amount, i.e. is greater than a predetermined threshold.

The magnitude of a relative overlap may range from 0 (no overlap) to 1 (fully overlapping). In such embodiments, the predetermined threshold may be a value in the region of 0.4 to 0.9. Preferably, the predetermined threshold is no less than 0.5, so that a majority of the two detection boxes need to overlap. This improves the accuracy of the method.

The skilled person will appreciate that the relative overlap may have a different possible range (e.g. from 0 to 100), and would be able to adapt the predetermined threshold accordingly. Thus, the predetermined threshold may, for example, be in the range of 0.4 to 0.9 times the maximum possible relative overlap value, e.g. no less than 0.5 times the maximum possible relative overlap value.

In response to the determined overlap exceeding the predetermined amount, one of the first and second detection boxes is marked for discarding, in steps 450, 455, 456. Otherwise, the method reverts back to step 410.

In particular, step 450 comprises determining if the confidence value of the first detection box is less than the confidence value of the second detection box.

In response to a positive determination in step 450, the process 400 marks the first detection box for discarding in step 455, as the confidence value for the first detection box is lower than the confidence value for the second detection box. In response to a negative determination in step 450, the process 400 marks the second detection box for discarding in step 456, as the confidence value for the second detection box is lower than the confidence value for the first detection box.

If the confidence values are equal, then either the first or second detection box can be discarded. This may be performed on (pseudo-)random basis. In another embodiment, a certain implementation may elect to always choose the first/second detection box for discarding if the confidence values are equal. In yet another embodiment, if the detection boxes are of different sizes, the larger detection box may be selected for discarding (as it may be assumed that the smaller detection box more accurately identifies a location of a target object).

In other words, steps, 450, 455 and 456 comprise a process of: in response to the determined relative overlap exceeding a predetermined threshold: marking the first detection box for discarding if the confidence value for the first detection box is less than the confidence value for the second detection box; and/or marking the second detection box for discarding if the confidence value for the second detection box is less than the confidence value for the first detection box.

Steps 450 and 455 can be omitted if it is already known that the first detection box has a greater/lower confidence value than the second detection box (e.g. if the detection boxes have been sorted in order of confidence and the first and second detection boxes selected based on the sorted order). Rather, the method may simply move directly to step 456.

The process 400 is repeated until all detection boxes for that tile have either been compared to each other detection box of that tile or been marked for discarding. This is illustrated in a decision step 460.

Figure 5:
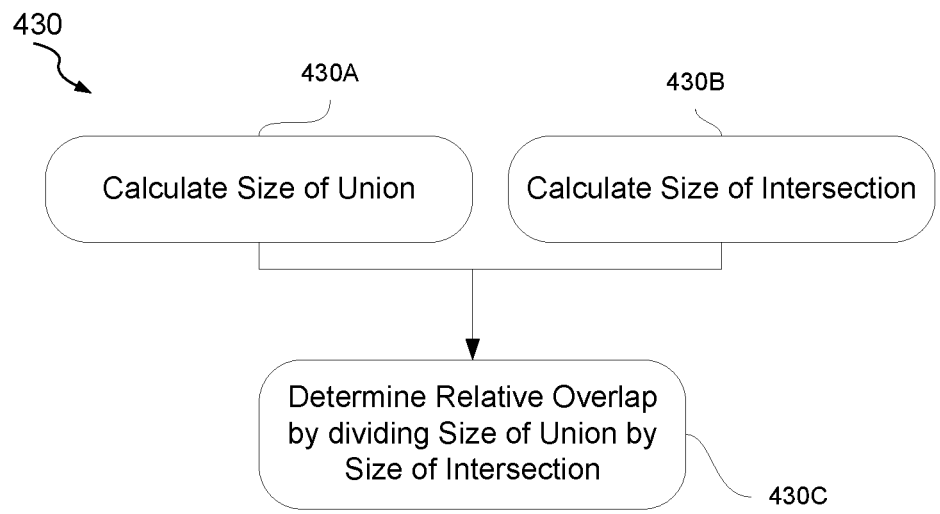
FIG. 5 is a flowchart illustrating another aspect of a method.

FIG. 5 illustrates one embodiment of step 430 for process 400.

In the illustrated embodiment, the step 430 comprises a sub-step 430A of determining a total area of the image occupied by the union (i.e. the combined area) of the first and second detection boxes.

The step 430 also comprises a sub-step 430B of determining a total area of the image occupied by the intersection of the first and second detection boxes. This sub-step effectively calculates a size of the overlap.

Sub-steps 430A and 430B may be performed consecutively (in any order) or in parallel.

The step 430 then moves to a sub-step 430C of calculating the relative overlap between the first and second detection boxes by dividing the total area of the image occupied by the intersection by the total area of the image occupied by the union of the first and second detection boxes.

This effectively normalizes the size of the overlap between the detection boxes with respect to the area occupied by the detection boxes. The process illustrated by FIG. 5 may be labelled an Intersection over Union (IoU) process.

Referring back to FIG. 4, in such embodiments, the predetermined threshold may be no less than (or equal to) 0.5, e.g. no less than (or equal to) 0.6. This will result in only those detection boxes for which a majority of the detection boxes overlap another detection box being considered for being marked for discarding. In other words, the only detection boxes considered for discarding are those for which a majority of the area (of the detection box) overlaps another detection box.

As previously explained, by performing the tile-by-tile suppression process, the number of other detection boxes that a single detection box has to be compared to is reduced. This can, in a number of circumstances, substantially reduce the complexity of the NMS process.

In a conventional NMS process, which includes a suppression process in which each detection box is compared to each other detection box (i.e. without tiling), the suppression process has complexity, using Big O notation, of $O(N^2)$, where N is the number of detection boxes in/for an image.

The proposed tile-by-tile suppression process has a different complexity.

Let N continue to represent the number of detection boxes in an image, and let $T^2$ be number of tiles into which the image is split (i.e. a total of $T^2$ tiles across an image).

A single iteration of the tile-by-tile suppression process (i.e. performing steps 341 and 342 for a single tile) can be modelled as having complexity $$O\left(\left(\frac{N}{T^2}\right)^2\right)$$

or $O(M^2)$, where M is equal to N divided by $T^2$. M represents the average number of detection boxes that overlap a tile. Thus, for the overall tile-by-tile suppression process, the complexity is $O(T^2M^2)$, which is equal to $$O\left(\frac{N^2}{T^2}\right).$$

It can be seen that the tile-by-tile suppression process itself therefore reduces the complexity of suppression by a factor of $T^2$ (or the number of tiles).

However, it is appreciated that this is only a model estimation, and that there are at least two more elements that need to be considered. Firstly, as the number of tiles increases (from 1 to many), there is an increased likelihood that each detection box will span multiple tiles. Secondly, we have an additional step 330 in which we need to identify, for each tile, which detections overlap the tile.

The first element can be accounted for by assuming an average number of tiles that a detection box is likely to span, "S". In particular, if each detection spans, on average, S tiles, then it is processed S times, which is an equivalent of having N*S detections which only process once. Thus:

$$M = \frac{N \times S}{T^2} \qquad (1)$$

and overall complexity is:

$$O(T^2M^2) = O\left(\frac{N^2 \times S^2}{T^2}\right) \qquad (2)$$

S can be calculated by estimating the ratio (R) between the dimensions of a tile (e.g. tile height/width) and the dimensions of an average detection rectangle (e.g. average detection box height/width), namely tile dimension(s)÷detection dimension(s).

The ratio R may be formed of two components, $R_H$ and $R_W$, e.g. in the form of a 2D vector. $R_W$ may represent a ratio between tile width and average detection rectangle width (tile width÷detection width) and $R_H$ may represent a ratio between tile height and average detection rectangle height (tile height÷detection height).

In other embodiments, a single value for R can be used—the single R representing an "average" ratio for both the height and width dimensions. Such an R could be derived using an average between height and width, i.e. R may be the ratio of the average of the height and width of a tile ($T_H$ and $T_W$) and the height and width of a detection box ($D_{AVH}$ and $D_{AVW}$), for example:

$$R = \frac{\frac{T_W + T_H}{2}}{\frac{D_{AVW} + D_{AWH}}{2}} = \frac{T_W + T_H}{D_{AVW} + D_{AVH}} \qquad (3)$$

As another example, a single R could be obtained by averaging a calculated $R_W$ and $R_H$ value.

Assuming a simplified case in which tiles and detection boxes are the same rectangular shape as one another (i.e. have the same width to height aspect ratio), such as a square. When R=1 (and, if present, $R_W=R_H$) then every detection box is as large as a tile, and it is very likely it will intersect exactly four tiles (unless it exactly aligns with tile edges). When R=0.5 (and, if present, $R_W=R_H$) then every detection box spans 2×2 tiles, and it is very likely it will intersect 3×3 tiles.

In general, it can be assumed that the parameter S follows the following equation, where R is formed from the two components $R_W$ and $R_H$:

$$S \sim \left(\frac{1}{R_H}+1\right) \times \left(\frac{1}{R_W}+1\right) \quad (4)$$

Where R is taken as a single value, this can be simplified as:

$$S \sim \left(\frac{1}{R}+1\right)^2 \quad (5)$$

Suitable methods for calculating and/or selecting R will be described later. It will be appreciated that the value R is responsive to the tile size (i.e. height and/or width).

The second element appreciates that identifying which detection box(es) overlaps each tile introduces some complexity. A simple operation for processing the detection boxes to identify which tiles they overlap has complexity O(N×S), as would be appreciated by the skilled person. In particular, it is recognised that the tiles divide an image into a regular rectangular grid and every detection occupies a rectangular section of the grid. This means it is possible to directly calculate (rather than search for) tiles overlapped by a particular detection. As the number of tiles overlapped by each detection averages S, the process of building tile lists is an O(N×S) operation.

Thus, the overall complexity of the method 300 (excluding low-complexity steps 310, 320 and 350 (and 370 if performed)) is a sum of $$O(N \times S) + O\left(\frac{N^2 \times S^2}{T^2}\right).$$

If a sorting step 360 is performed (e.g. following the full process illustrated in FIG. 3), then there is some additional complexity for the sorting step, which has complexity O(N×log(N)).

Thus, the overall complexity of the method 300, including the sorting step, can be modelled as a sum of $$O(N \times S) + O\left(\frac{N^2 \times S^2}{T^2}\right) + O(N \times \log(N)).$$

For the sake of completeness, it is noted that the complexity of steps 350 and 370 are both O(N).

The skilled person would appreciate that conventional NMS techniques typically make use of a sorting step, so that including a sorting step would not increase the complexity of the proposed NMS technique beyond that of the conventional NMS technique.

Table 1 contains theoretical complexity values for the conventional (CON) and herein proposed (TILE) version of NMS, for variations of the number of detection boxes N, approximate number of tiles T across a dimension of the image (estimated to be $\sqrt{T^2}$), and ratio R, in different use case scenarios. It is noted that the complexity values for the TILE version of NMS include only the complexity of steps 330 and 340 (the main contributors to complexity). The value of N depends on the use case. Values T and R are algorithmic parameters, where T can be derived from R, image size (represented by I) and average detection rectangle size (represented by $D_{AV}$).

R acts as an "intermediate parameter". For Table 1, R is a single value, e.g. rather than a different value for the height and width dimensions.

TABLE 1

| Use Case | Parameters | | | Intermediate Values | | Estimated No. of Calculations | |
|---|---|---|---|---|---|---|---|
| | N | T | R | S | M | CON | TILE |
| 1 | 10 | 2 | 5 | 1.44 | 3.60 | 100 | 66 |
| | 10 | 20 | 0.5 | 9 | 0.23 | 100 | 110 |
| | 10 | 200 | 0.05 | 441 | 0.11 | 100 | 4896 |
| 2 | 100 | 2 | 10 | 1.21 | 30.3 | 10000 | 3781 |
| | 100 | 20 | 1 | 4 | 1.00 | 10000 | 800 |
| | 100 | 200 | 0.1 | 121 | 0.30 | 10000 | 15760 |
| 3 | 1000 | 2 | 50 | 1.04 | 260 | 1000000 | 271648 |
| | 1000 | 20 | 5.0 | 1.44 | 3.60 | 1000000 | 6624 |
| | 1000 | 200 | 0.5 | 9 | 0.23 | 1000000 | 11025 |

In the context of the description, size means the dimensions of an element, e.g. a height and/or width of an element, rather than an area. Image size I and detection rectangle size $D_{AV}$ may depend on the use case.

Where appropriate in the following description, particularly in equations, a circumflex "^" (sometimes called a "hat", "roof" or "house") is used to indicate a (size) dimension of an element, which can be substituted by an appropriate dimension (e.g. height or width). Thus, the parameter $\hat{I}$ (referring to a dimension of an image) can be substituted by either $I_W$ (image width) or $I_H$ (image height). Dimensional substitutions are consistent throughout the same equation, such that if an equation includes two parameters annotated with respective circumflexes, each substituted parameter must refer to a same dimension (i.e. height or width respectively).

The height and/or width (i.e. size components or dimensions) of an average detection rectangle $D_{AV}$ can be derived from the following equation:

$$\widehat{D_{AV}} = \frac{\hat{I}}{T \times R} \quad (6)$$

where $\widehat{D_{AV}}$ represents a single dimension of the average detection rectangle (i.e. a height or a width), and can be substituted with average detection rectangle height $D_{AVH}$ or average detection rectangle width $D_{AVW}$ where appropriate. $\hat{I}$ represents a corresponding dimension of the image (e.g. where $\widehat{D_{AV}}$ is substituted with $D_{AVH}$, $\hat{I}$ is substituted with image height $I_H$). The value R can be a single value (for both height and width, as previously explained) or a different value depending on whether height or width is being calculated (e.g. replaced with $R_H$ or $R_W$).

The parameter $$\frac{1}{T}$$

in equation 6 can be replaced by the parameter $\hat{T}_s$ (i.e. Tile Dimension, being a height or width, where appropriate, of a tile).

In Table 1, values have been selected so that T×R is constant for each use case. Use case 1 represents a use case in which there are a low number of relatively large detection boxes, e.g. a holiday picture where detection boxes target faces. Use case 2 represents a use case in which there are a medium number of relatively medium-sized detection boxes per image, e.g. a self-driving car detecting pedestrians. Use case 3 represents a use case in which there are a high number of relatively small detection boxes, e.g. a picture of a crowd identifying faces.

Table 1 clearly illustrates how the number of calculations can be reduced, for certain use cases, when using the tile-based NMS approach disclosed herein, rather than the conventional approach.

The proposed NMS technique performs particularly well if there are many small objects in the scene (so that each detection occupies a small number of tiles, i.e. S is small) and objects are spread evenly across the image (i.e. maximum number of detection boxes per tile is small). Suitable use case scenarios could include a surveillance camera image (of a crowd or crowded area) from a moderate or large distance, for which a target object are faces of people or a photograph of a locust swarm, for which a target object is a locust.

One important consideration in improving and/or optimizing implementations of the proposed method is appropriate selection of the number of tiles and/or tile size (height and width).

Tile size (height and/or width of each tile) can have a significant effect on the efficiency of the proposed NMS approach. Inappropriate selection of a tile size can negatively impact the efficiency of the NMS approach.

It has been recognised that efficiency of the proposed method depends on at least an average number of tiles each detection box intersects/overlaps and average number of detections per tile. Both of these factors are influenced by the tile size (with respect to characteristics of the detection boxes of the image).

In particular, if a magnitude of R decreases, then a detection box will likely overlap more tiles (therefore increasing duplicate processing of the same detection box in different tiles). However, if a magnitude of R increases, then more detection boxes will be present in each tile, increasing the number of computations that need to be performed per tile.

A compromise therefore needs to be made between these two extremes, and appropriate selection of R can enable calculation of an appropriate tile size.

Choosing or determining R is a particularly suitable methodology for calculating tile size (a tile height or width), as it can be calculated independently of the specific image size, e.g. based on estimates for a use case scenario. Examples of this will be provided below.

For a given R, the dimensions $\hat{T}_s$ of the tile, i.e. the tile size, can be readily calculated using the following equation:

$$\hat{T}_s = R \times \widehat{D_{AV}} \qquad (7)$$

In some embodiments, equation (7) is modified to calculate a tile width $T_W$ and/or a tile height $T_H$, by substituting the indicative parameter $\hat{T}_s$ with $T_W$ or $T_H$ and the indicative parameter $\widehat{D_{AV}}$ with $D_{AVW}$ or $D_{AVH}$ (respectively) where appropriate, in a manner analogous to that described with reference to equation (6). In particular, a tile width $T_W$ may be calculated using the following equation:

$$T_W = R \times D_{AVW} \qquad (8)$$

With tile height $T_H$ being calculated using the following equation:

$$T_H = R \times D_{AVH} \qquad (9)$$

where $D_{AVW}$ is average detection box width and $D_{AVH}$ is average detection box height.

R may be kept constant (for both equations 8 and 9), or different values for R (i.e. $R_W$ and $R_H$ respectively) may be used in the calculation of tile width $T_W$ and tile height $T_H$. Unless explicitly identified, the following description assumes that R is a single value used for both tile width $T_W$ and tile height $T_H$.

Figure 6:
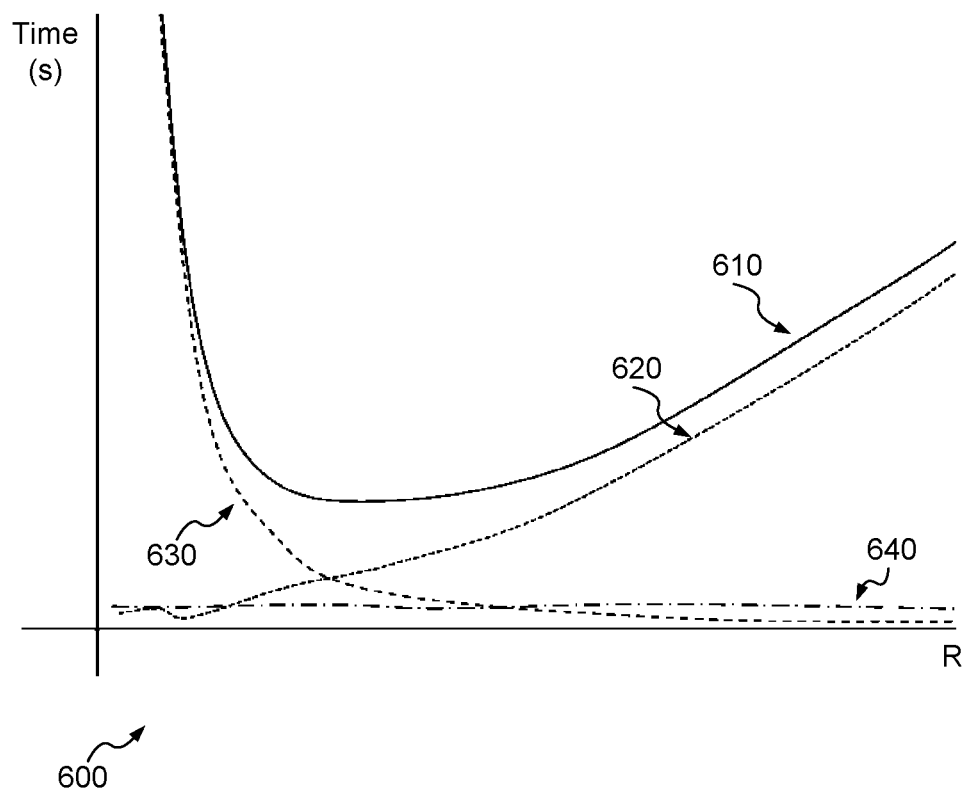
FIG. 6 illustrates a relationship between tile size and time taken to execute a method according to an embodiment.

For the sake of further understanding, FIG. 6 illustrates a relationship between a value R (which is here a common value shared between the width and height dimensions) and a time taken to perform the NMS method of the present disclosure for test detection box data of a particular scenario.

For the illustrated scenario, the detection box data and the image data is kept constant. Thus, the number of detection boxes, the average size of the detection boxes and the image size have been kept constant. As the average size of the detection boxes is kept constant, an increase in R represents an increase in the tile size (both height and width).

Line 610 illustrates the overall time taken to perform the NMS method on the test detection box data. Line 620 represents the time taken to perform the tile-by-tile suppression process (e.g. process 340 of FIG. 3). Line 630 represents the time taken to identify, for each tile, which detection boxes overlap the tile. Line 640 represents the time taken to construct the output list of detection boxes that have not been marked for deletion. Where a sorting step is performed, line 640 could instead and/or additionally represent the time taken to perform the sorting step (as this is also of a low complexity).

As can be seen from FIG. 6, the value of R affects the time taken to perform the NMS method. Selection of an appropriate R, and therefore tile size $T_s$, can therefore improve the efficiency of the NMS method (e.g. selecting an R so that the time taken to perform the NMS method is at the minimum).

However, the relationship between R and time taken to perform the proposed NMS method may change for different use case scenarios. Thus, the tile size may differ depending upon the use case scenario.

The disclosure recognises that the relationship between R and time taken to perform the proposed NMS method varies in response to changing a number of parameters, including (but not limited to) ratio (Rs) between average detection box size and image size (e.g. average detection box size divided by image size) and the number n of (target) objects in an image.

Figure 7:
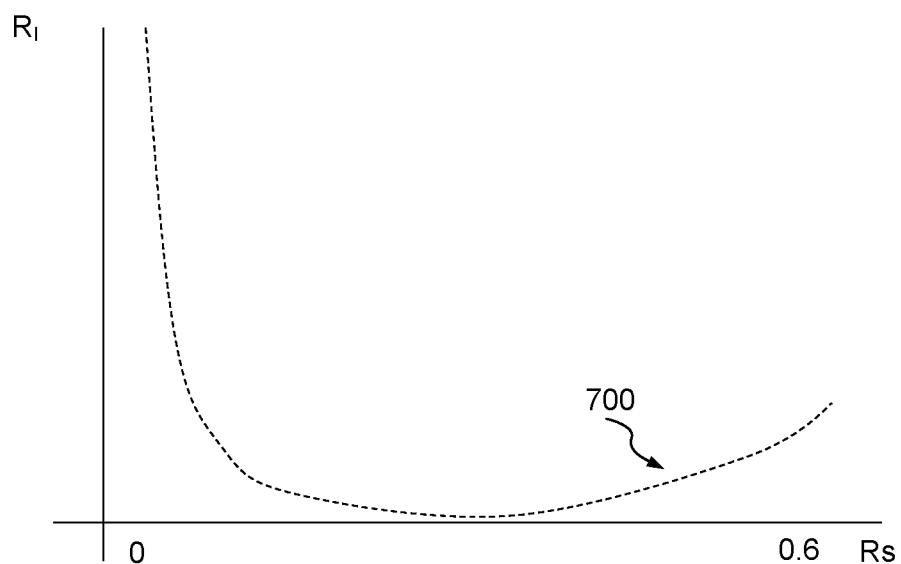
FIGS. 7 and 8 illustrate a relationship between various parameters and a recommended intermediate parameter R for a method according to an embodiment.

FIG. 7 illustrates the relationship between the "ideal", $R_I$ (i.e. the R that results in the lowest time taken to perform the proposed NMS method for some sample data) and the ratio Rs, which has been derived from tests of sample detection box data. All other variables (apart from the ratio Rs) are kept constant.

The relationship is illustrated by line 700.

It will be understood that the value Rs will always be less than 1 (as the average detection box will not be larger than the image size). Although purely exemplary, in FIG. 7, the values of Rs range from 0 to 0.6.

From FIG. 7, the skilled person would appreciate that the relationship between the ideal $R_I$ value and the value Rs appears to be representable by:

$$R_I \propto \frac{1}{Rs} + Rs.$$

Figure 8:
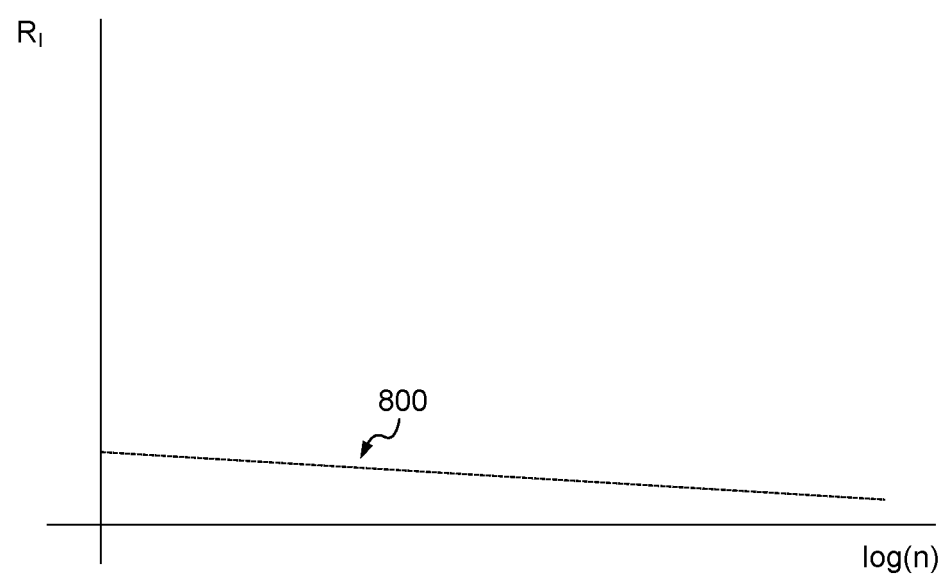

FIG. 8 illustrates the relationship between the "ideal" $R_I$ and the number n of target objects in an image. This relationship has also been derived from tests of sample detection box data, during which all other variables (apart from the number of objects, and total number of detection boxes) are kept constant.

The relationship is illustrated by line 800.

From FIG. 8, the skilled person would readily appreciate that the relationship between the ideal $R_I$ value and the number of (target) objects in an image appears to be representable by: $R_I \therefore -\log(n)$.

There may also be a small dependency on the number of duplicate detections per object, although tests have demonstrated that this relationship is low.

If it is possible to estimate or calculate one or more of these parameters, then an R may be selected/generated that can be used to calculate the "optimal" or "ideal" tile size.

The value of at least some of these parameters (e.g. the ratio Rs and the number n) can be predicted based upon the use case scenario. For example, if a use case scenario is for detection boxes that identify faces within a large crowd, then the number n of objects can be estimated in advance (e.g. based upon capacity of the area and/or known business of the area) and the ratio Rs can be estimated (e.g. based on an estimated distance between a camera providing the image and the objects to be detected).

Other methods of estimating these parameters will be apparent to the skilled person. By way of example, experiments could be performed based on sample images for a use case scenario, or previous frames captured by an image capturing device (e.g. a camera) could be used to estimate the values Rs and/or n. Other embodiments may employ an operator's experience to select appropriate values for these parameters.

This enables an appropriate value for R (e.g. if generated using Rs and n) to be obtained using estimates of these values. These estimates are independent of the specific image resolution, and can therefore be generalized for different implementation scenarios (e.g. different cameras monitoring a same scene). The value R is therefore a particularly convenient value to work with in analysis and during an initial set up.

Thus, in some preferred embodiments, the R (and therefore the tile size) is made dependent upon 1) the (predicted) ratio between average detection box size and the image size and/or 2) the (predicted) number of (target) objects in the image.

As previously mentioned, the (height and width) dimensions of the tile, i.e. the tile size, can be calculated from R using one or more of equations (7)-(9). The parameter $\widetilde{D_{AV}}$ for this equation can be calculated using the following equation:

$$\widetilde{D_{AV}} = \widetilde{Rs} \times \hat{I} \quad (10)$$

where $\hat{I}$ is a dimension of the image, i.e. image size, which is a known quantity. The parameters $D_{AVW}$ and $D_{AVH}$ can be calculated using an adapted version of equation (10) where parameter $\widetilde{Rs}$ is replaced by a parameter $R_{SW}$ (representing a ratio between average detection box width and image width) and $R_{SH}$ (representing a ratio between average detection box height and image height) respectively.

Optionally, the R (and therefore the tile size) may be further or otherwise made dependent upon 3) the (estimated) number of duplicate detections per object.

It has previously been described how the ideal R has some dependency upon the ratio Rs (being the ratio between average detection box size and image size). Thus, the R (and/or tile size) may be dependent upon an estimated value for Rs. In some embodiments, the R (and/or tile size) may be dependent upon 1/Rs+Rs.

It has previously been described how the ideal R has some dependency upon the number n of objects in the image. Thus, the R (and/or tile size) may be dependent upon an estimated value for n (the estimated number of objects). In some embodiments, the R (and/or tile size) may be dependent upon $-\log(n)$.

The ideal R may have some dependency upon the number of duplicate detections per object. Thus, the R (and/or tile size) may be dependent upon the estimated number of duplicate detections per object.

Suitable equations or functions for calculating R based upon such parameters will be readily derivable by the skilled person. This may comprise iteratively executing a number of tests for determining the "ideal" R, based upon different values for the parameters.

In one example, an equation/function for calculating R is derived by combining partial equations (derived from tests in which individual modifications to the parameters have been made) for the individual parameters.

However, a more optimal equation/function for calculating R can be obtained by estimating R by fitting all the parameters (Rs and n) at once.

One suitable equation for calculating an appropriate value of R is as follows:

$$R(Rs, n) = \left(P_3 \times \left(\frac{1}{P_1(Rs + P_2)} + Rs\right) + P_4\right) - \qquad (11)$$
$$\left(\left(Q_3 \times \left(\frac{1}{Q_1 \times (\log_{10}(n) + Q_2)} + \log_{10}(n)\right) + Q_4\right) \times\right.$$
$$\left.\left(\left(P_3 \times \left(\frac{1}{P_1 \times (Rs + P_2)} + Rs\right) + P_4 + W_1\right) \times W_2\right)\right) + W_3$$

For this equation to generate a suitable value for R, the following parameters can be used: $P_1=43$; $P_2=0$; $P_3=10$; $P_4=23$; $Q_1=0.2$; $Q_2=1$; $Q_3=6$; $Q_4=-25$; $W_1=-23$; $W_2=0.1$; $W_3=-23.5$. This results in the following equation:

$$R(Rs, n) = \left[\frac{1}{4.3 \times Rs} + 10 \times Rs + 23\right] - \qquad (12)$$
$$\left[\left(\frac{6}{0.2 \times (\log_{10}(n) + 1)} + \log_{10}(n) \times 6 - 25\right) \times \left(\frac{1}{43 \times Rs} + Rs\right)\right] - 23.5$$

Other suitable parameters, and equations, would be apparent to the skilled person when attempting to calculate/design/derive an equation that maps the parameters Rs and n to an "ideal" value of R.

A tile height and/or tile width may be calculated using any above-described mechanism.

In one embodiment, two component values for R are an $R_W$ (or R width) value and an $R_H$ (or R height) value, which are used to derive the tile width $T_W$ and tile height $T_H$ respectively.

In another example, a single or combined R is calculated, which is subsequently used to calculate a tile height and/or width using equations 8 and 9.

A full working example for calculating tile size for a particular use case is hereafter described, for the purposes of clarity.

In this example, an image has a resolution of 4096×2160, and represents a personal (e.g. holiday or social outing) image of one or more people. The target object (that a detection box attempts to identify the location of) is a person's face.

For a typical use case, the number of people per personal image would vary between 2 to 5, so a 'busy' scene would probably have 4-5 people. Based on this understanding, the value of n is estimated to be around 4.

In a first scenario, a tile width $T_W$ and tile height $T_H$ are calculated from separate R values ($R_w$ and $R_H$ respectively). This requires an estimation of a width ratio $R_{SW}$, being a ratio between average detection box width and image width, and height ratio $R_{SH}$, being a ratio between average detection box height and image height.

This could be performed by processing an example personal image with an object detection process, and calculating the average detection box width/height and dividing this/these values by the image width/height. In another example, this is performed by a user and provided via a user input.

According to one estimate, the estimated $R_{SW}$ is 0.0700 and the estimated $R_{SH}$ is 0.1256.

We can calculate a value for R separately for width and height ($R_W$ and $R_H$ respectively), e.g. by applying equation 12. Using the above values for $R_{SW}$ and $R_{SH}$ (and when n=4), $R_W$=4.593 and $R_H$=3.435.

Finally we calculate a desired tile width and height (i.e. tile size), using equations 8 and 9. For a target camera resolution of 4096×2160: $D_{AVW}$=4096×$R_{SW}$→$T_W$=1317 pixels; $D_{AVH}$=2160×$R_{SH}$→$T_H$=932 pixels. This implies a grid of 3.11×2.32 tiles. The grid values can be rounded to a nearest integer (e.g. 3×2 tiles).

In a second scenario, a tile width $T_W$ and tile height $T_H$ are calculated from a single, combined (or average) R (R). This requires an estimation of a ratio Rs between average detection box size and image size.

This could be performed by processing one or more example personal images (for a particular use case scenario) with an object detection process to generate sample detection boxes. A midway point between detection box height and detection box width may be calculated for each sample detection box. The average of the midway points can be used to calculate the combined average Rs value. In other words:

$$Rs = \frac{\frac{1}{X}\left(\sum_{DB} \frac{W(DB) + H(DB)}{2}\right)}{\frac{I_H + I_W}{2}} \quad (13)$$

where X is the number of sample detection boxes, DB indicates a unique sample detection box, W(DB) is the width of the sample detection box, H(DB) is the height of the sample detection box, $I_H$ is the image height and $I_W$ is the image width.

According to one estimate for the example, the value Rs=0.0917.

Calculating a value for R using this Rs value (and n=4), by applying equation 12, outputs an R of 3.87.

Finally, tile width $T_W$ and height $T_H$ (i.e. tile size) can be calculated using this calculated R. For a target camera resolution of 4096×2160, and applying equations 8 and 9, $T_W$=1453 pixels and $T_H$=766 pixels. This implies a grid of 2.82×2.82 tiles ((4096/1453)×(2160/766)). The grid values can be rounded to a nearest integer (e.g. 3×3 tiles).

It can be seen that both approaches for determining tile size (i.e. either obtaining an individual $R_W$ and $R_H$ or obtaining a combined R) obtain approximately the same results. In this particular example, the difference between the two approaches is roughly 10%-20%, which is not significant in a practical implementation.

As an alternative to rounding the grid dimensions up or down (thereby dividing the image into same size tiles), it may be possible to instead use the directly calculated tile dimensions, e.g. applying padding to the image where appropriate and/or accepting partial rightmost and bottommost tiles.

Embodiments may be useful in any circumstances in which non-maximum suppression, NMS, is to be performed on detection boxes for an image, such as those generated at the output of an object detection methodology.

Embodiments may be particularly useful when implemented in a graphics processing system, where the graphics processing system performs object recognition of an image.

Embodiments are particularly useful when an object detection method identifies a large number of relatively small objects in an image, where the small objects are distributed throughout the image. In these circumstances, the tiling of the image significantly decreases the complexity of executing NMS.

The above described method can be implemented in software, in hardware or in a combination of the two. Some steps, such as a sorting process, may be deemed too complicated and/or of limited use to warrant hardware acceleration, but this is not excluded from consideration.

Embodiments may therefore find particular utility in a processing system such as a graphics processing system, or an artificial intelligence accelerator system (for example, comprising a neural network accelerator).

Figure 9:
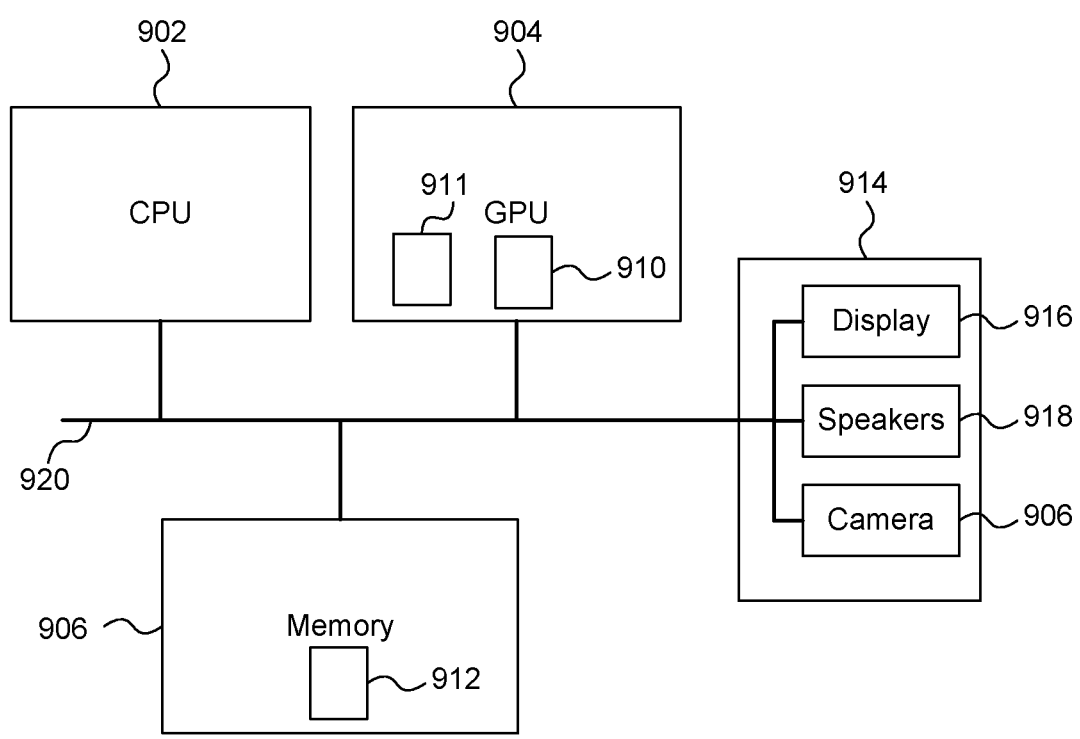
FIG. 9 shows a computer system in which a graphics processing system for performing a method is implemented.

FIG. 9 shows a computer system in which such a graphics processing system may be implemented. The computer system comprises a CPU 902, a GPU 904, a memory 906 and other devices 914, such as a display 916, speakers 918 and a camera 106. A processing block 910 (for performing any herein described method) may be implemented on the GPU 904. In other examples, the processing block 910 may be implemented on the CPU 902. The components of the computer system can communicate with each other via a communications bus 920. A store 912 is implemented as part of the memory 906, and may be used to store computer code that is executed by the processing block 910 for carrying out any herein described methods.

While FIG. 9 illustrates one implementation of a graphics processing system, it will be understood that a similar block diagram could be drawn for an artificial intelligence accelerator system—for example, by supplementing or replacing either the CPU 902 or the GPU 904 with a Neural Network Accelerator (NNA) 911, or by adding the NNA as an additional unit. In such cases, the processing block 910 can be (at least partially) implemented in the NNA.

In the illustrated embodiment, the GPU 904 comprises a neural network accelerator 911 alongside the processing block 910, which can be labelled a processing module. The neural network accelerator 911 may be configured to process an image to generate a plurality of detection boxes identifying potential locations for one or more objects within an image, with the processing block 910 performing any herein described method for performing non-maximum suppression on the generated plurality of detection boxes. The NNA may generate, for example, detection box data identifying, for each of the plurality of detection boxes, a location of the detection box within the image and a confidence value indicating the confidence that the detection box identifies an object In other embodiments, the processing block may be located in another aspect of the computer system (e.g. as a component part of the CPU 902) and/or the NNA may be located in another aspect of the overall computer system (e.g. a dedicated, separate module).

The methods illustrated in FIGS. 3 to 5 are shown as comprising a number of functional blocks. This is schematic only and is not intended to define a strict division between or sequence of different logic elements of such entities. Each functional block may be provided in any suitable manner.

It is to be understood that any intermediate values described herein (such as R) need not be physically generated by a processing block (e.g. of a graphics processing system) at any point and may merely represent logical values which conveniently describe the process performed when executing the method (between its input and output).

The methods described herein may be executed in hardware on an integrated circuit. A graphics processing system may be configured to perform any of the methods described herein.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein. An integrated circuit definition dataset may be, for example, an integrated circuit description.

Therefore, there may be provided a method of manufacturing, at an integrated circuit manufacturing system, a graphics processing system for carrying out any method as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 10.

Figure 10:
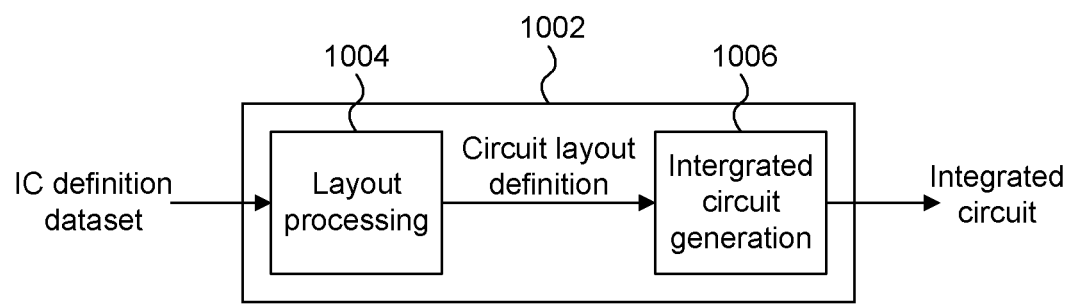
FIG. 10 shows an integrated circuit manufacturing system for generating an integrated circuit embodying a graphics processing system.

FIG. 10 shows an example of an integrated circuit (IC) manufacturing system 1002 which is configured to manufacture a graphics processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1002 to manufacture an integrated circuit embodying a graphics processing system as described in any of the examples herein.

The layout processing system 1004 is configured to receive and process the IC definition dataset to determine a circuit layout. Methods of determining a circuit is layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method for performing non-maximum suppression (NMS) on a plurality of detection boxes identifying potential locations for one or more objects within an image, the computer-implemented method comprising:
   dividing the image into a plurality of tiles;
   identifying, for each tile, which, if any, detection boxes overlap a portion of the tile, wherein a confidence value is associated with each detection box;
   performing a tile-by-tile suppression process comprising, for each tile having detection boxes that overlap one another by more than a predetermined amount:
      comparing confidence values of detection boxes that overlap one another by more than a predetermined amount, a confidence value indicating the confidence that the detection box identifies an object, and for each comparison, marking the detection box associated with the lowest confidence value for discarding.

2. The computer-implemented method of claim 1, wherein the tile-by-tile suppression process comprises, for each tile, iteratively performing a thresholding process comprising:
selecting a first detection box overlapping a portion of the tile, wherein the first detection box has not been marked for discarding;
selecting a second, different detection box overlapping a portion of the tile for comparing to the first detection box, wherein the second detection box has not been marked for discarding and wherein the first and second detection boxes have not previously been compared to one another during the thresholding process for the tile;
determining a relative overlap between the selected first and second detection boxes; and
in response to the determined relative overlap exceeding a predetermined threshold:
marking the first detection box for discarding if the confidence value for the first detection box is less than the confidence value for the second detection box; and/or
marking the second detection box for discarding if the confidence value for the second detection box is less than the confidence value for the first detection box,
wherein the thresholding process for a tile is repeated until all detection boxes of that tile have either been compared to each other detection box of that tile or been marked for discarding.

3. The computer-implemented method of claim 2, wherein the step of determining the relative overlap between the selected first and second detection boxes comprises:
determining a total area of the image occupied by the union of the first and second detection boxes;
determining a total area of the image occupied by the intersection of the first and second detection boxes; and
calculating the relative overlap by dividing the total area of the image occupied by the intersection of the first and second detection boxes by the total area of the image occupied by the union of the first and second detection boxes.

4. The computer-implemented method of claim 2, further comprising a step of sorting the detection boxes by order of confidence, and wherein:
the step of selecting the first detection box comprises selecting the most confident detection box that has not been marked for discarding and has not previously been compared to all other detection boxes that have not been marked for discarding during the thresholding process for the tile; and
the step of selecting the second detection box comprises selecting a detection box that has not previously been compared to the first detection box.

5. The computer-implemented method of claim 1, wherein:
the computer-implemented method further comprises a step of sorting the detection boxes by order of confidence, the step of sorting taking place before the tile-by-tile suppression process; or
the tile-by-tile suppression process comprises, for each tile, sorting the detection boxes overlapping a portion of the tile by order of confidence.

6. The computer-implemented method of claim 1, wherein the size of each tile is dependent upon:
an estimated ratio between size of the detection box and a resolution of the image; and/or
an estimated number of objects in the image; and/or
an estimated size of a detection box and a resolution of the image.

7. The computer-implemented method of claim 1, further comprising:
identifying detection boxes associated with a confidence value below a predetermined confidence value threshold; and
marking detection boxes associated with a confidence value below the predetermined confidence value threshold for discarding,
optionally wherein the step of identifying, for each tile, which, if any, detection boxes overlap a portion of the tile does not identify detection boxes that have already been marked for discarding.

8. The computer-implemented method of claim 1, wherein the step of performing a tile-by-tile suppression process is performed using a parallel processing technique.

9. The computer-implemented method of claim 1, wherein the step of identifying, for each tile, which, if any, detection boxes overlap a portion of the tile comprises generating, for each tile, a tile list identifying which, if any, detection boxes overlap a portion of the tile.

10. The computer-implemented method of claim 1, further comprising building an output list of detection boxes, the output list identifying detection boxes that have never been marked for discarding during the tile-by-tile suppression process, optionally wherein either:
the step of marking the detection box associated with the lowest confidence value for discarding comprises modifying a flag associated with the detection box; and the step of building an output list of detection boxes comprises processing the flags to identify detection boxes that have never been marked for discarding during the non-maximum suppression method; or
the step of building an output list comprises initializing a global list identifying all detection boxes, before performing the tile-by-tile suppression process, and the step of marking the detection box associated with the lowest confidence value for discarding comprises modifying a flag in the global list associated with the detection box for marking, so that when the tile-by-tile suppression process is complete, the global list facilitates provision of the output list identifying detection boxes that have never been marked for discarding.

11. The computer-implemented method of claim 1, further comprising a step of obtaining detection box data identifying, for each of the plurality of detection boxes, a location of the detection box within the image and a confidence value indicating the confidence that the detection box identifies an object,
wherein the step of identifying, for each tile, which, if any, detection boxes overlap a portion of the tile comprises processing the detection box data to identify, for each tile, which, if any, detection boxes overlap a portion of the tile.

12. A computer-implemented method for performing non-maximum suppression (NMS) on a plurality of detection boxes identifying potential locations for one or more objects of different classes within an image, the computer-implemented method comprising:

dividing the plurality of detection boxes into different classes, each class of detection box being associated with a different class of object; and performing the method as set forth in claim 1 on each class of detection box.

13. A graphics processing system configured to perform the method of claim 1.

14. The graphic processing system of claim 13, wherein the graphics processing system comprises:

a neural network accelerator configured to process an image to generate a plurality of detection boxes identifying potential locations for one or more objects within an image; and a processing module configured to obtain the plurality of detection boxes from the neural network accelerator and perform the method of claim 1.

15. The graphics processing system of claim 13, wherein the graphics processing system is embodied in hardware on an integrated circuit.

16. A method of manufacturing, using an integrated circuit manufacturing system, a graphics processing system as claimed in claim 13, the method comprising:

processing, using a layout processing system, a computer readable description of the graphics processing system so as to generate a circuit layout description of an integrated circuit embodying the graphics processing system; and manufacturing, using an integrated circuit generation system, the graphics processing system according to the circuit layout description.

17. A non-transitory computer readable storage medium having stored thereon a computer readable dataset description of a graphics processing system as claimed in claim 13 that, when processed in an integrated circuit manufacturing system, causes the integrated circuit manufacturing system to manufacture an integrated circuit embodying the graphics processing system.

18. An integrated circuit manufacturing system comprising:

a non-transitory computer readable storage medium having stored thereon a computer readable description of a graphics processing system as claimed in claim 13;

a layout processing system configured to process the computer readable description so as to generate a circuit layout description of an integrated circuit embodying the graphics processing system; and an integrated circuit generation system configured to manufacture the graphics processing system according to the circuit layout description.

\* \* \* \* \*